United States Patent [19]
Tanie et al.

[11] Patent Number: 4,756,662
[45] Date of Patent: Jul. 12, 1988

[54] VARIBLE COMPLIANCE MANIPULATOR

[75] Inventors: Kazuo Tanie, Ushiku; Makoto Kaneko; Kazuhito Yokoi, both of Ibaraki, all of Japan

[73] Assignees: Agency of Industrial Science & Technology; Ministry of International Trade & Industry, both of Tokyo, Japan

[21] Appl. No.: 31,595

[22] Filed: Mar. 30, 1987

[30] Foreign Application Priority Data

Mar. 31, 1986 [JP] Japan .................................. 61-73145
Dec. 15, 1986 [JP] Japan .................................. 61-298305

[51] Int. Cl.$^4$ .............................................. B25T 9/06
[52] U.S. Cl. ................................... 414/729; 414/744 A; 901/15; 901/48
[58] Field of Search ............... 414/735, 744 A, 917, 414/729; 901/15, 23, 24, 34, 45, 48

[56] References Cited
U.S. PATENT DOCUMENTS

| | | | |
|---|---|---|---|
| 4,445,273 | 5/1984 | Brussel et al. | 414/730 X |
| 4,507,043 | 3/1985 | Flatau | 414/719 |
| 4,534,694 | 8/1985 | Tuda | 901/15 X |

Primary Examiner—Robert J. Spar
Assistant Examiner—Donald W. Underwood
Attorney, Agent, or Firm—Oblon, Fisher, Spivak, McClelland & Maier

[57] ABSTRACT

A variable compliance manipulator comprising a five linkage structure in which one stationary segment and at least four moving segments are connected with one another through joints each having one degree of freedom, and actuators disposed on two or three of the joints and having a variable-stiffness property, wherein the stiffness of motion of the manipulator in working can be adjusted by detecting and delivering the change in angle of the moving segments to a servo system for controlling the actuators.

4 Claims, 8 Drawing Sheets $Kx = 0$
$Ky = C$
$Kxy = Kyx = 0$ $Kx = C$
$Ky = 0$
$Kxy = Kyx = 0$

4,756,662

VARIBLE COMPLIANCE MANIPULATOR

BACKGROUND OF THE INVENTION

This invention relates to a manipulator with a function of varying its structural compliance by adjusting the compliance of each joint.

In recent years, robot manipulators have achieved remarkable development. Generally, the conventional robot manipulator comprises arm links and joints with multidegrees of freedom so as to be able to take over human manual work. In order to enable the robot manipulator to reproduce faithfully the skillful motions a man can perform, there has been studied a manipulator control method in which means for controlling the position and means for controlling the force are employed.

In order to have such a manipulator perform a predetermined job, it is in general important not only to vary the force and position at the end effector of the manipulator but also to control the relation between the force and position, i.e. stiffness, according to the nature of the job. For example, as shown in FIG. 1, assuming that a hand 2 mounted on the front end of an arm 1 performs a peg-in-hole task for inserting a pin W into a hole H formed in a machine part, the stiffness of manipulator structure at the task coordinate axes defined on the hand can be modeled as schematically illustrated in FIG. 1. Let us assume that the stiffnesses of the robot manipulator in the directions of the x-, y- and z-axes on the task coordinate system in which the z-axis defined on the pin W grasped by the hand 2 is parallel with the central axis of the hole H are designated by variables $k_x$, $k_y$, $k_z$, $\alpha_x$, $\alpha_y$ and $\alpha_z$. In such work, it is required that the stiffness of the arm be hard with regard to the motion in the direction of the axis of the hole and be soft with regard to the motion in the radius direction of the hole. That is, if the stiffness is soft in the x- and y-directions, a slight displacement or tilting of the pin is absorbed by the low stiffness portion, thereby to permit the pin to be flexibly inserted into the hole. In actual practice, therefore, by making $k_z$ large and $k_x$, $k_y$ small, the pin W can be inserted into the hole H without exceeding the colliding force produced when the pin W collides against the inner surface of the hole H.

One example of such a conventional method for performing the above-mentioned work will be described hereinafter. Such a robot arm as described above is provided at its joints $J_1$, $J_2$ and $J_3$, for example, with torque sensors. In addition, the arm is designed so that it can perform positional control. And, as shown in FIG. 2, the reaction F at the edge of the hole which will be caused by the interaction between the hole and the pin is detected through torque outputs $\tau_1$, $\tau_2$ ... of the torque sensors provided on the joints. The amount and direction of the reaction force F can be determined by analyzing the structure of the manipulator with the torque outputs $\tau_1$, $\tau_2$ ... detected at the joints. Based on the amount and direction of the reaction thus obtained, the positional commands $\theta_1$, $\theta_2$ ... are successively sent to the joints of the manipulator so that the manipulator moves in the direction in which the reaction is reduced so as to move the hand 2 by small displacement along the axial direction of the hole H. As a result, by reducing the reaction force F and gradually moving the hand 2 in the axial direction of the hole H, the insertion of the pin into the hole can be accomplished.

In the above-mentioned control system, unless the detection of the reaction force F and delivery of the positional commands to the control system are carried out in very minute time steps, there is a possibility that a large reaction will be produced while the work is in progress, consequently breaking the object being worked on. In order to move it in minute steps, however, much working time is generally required and this is undesirable.

SUMMARY OF THE INVENTION

In view of the above-mentioned circumstances, it is an object of the present invention to provide a variable compliance manipulator in which the stiffness of the manipulator can be adjusted over a wide range independently and directly, without any interaction with the object being worked on, and which has favorable manipulation performance well suited to the external restrictions.

In order to achieve the above object, the variable compliance manipulator of the present invention comprises a linkage arm having one stationary segment and at least four moving segments, which are connected in a linkage state with one another through the medium of five joints each having one degree of freedom; a manipulator hand provided on the one of movable segments which is not adjacent to the stationary segment; and actuators provided on at least two joints of the five joints and having a variable stiffness property.

The manipulator hand acting as a working element at the point of application of the arm can be positioned in a desired point on the working space by the arm of the five-linkage structure. When the actuators having the variable stiffness property are provided on three of the joints, the stiffness in all directions can be easily and reliably varied over a wide range without any motion of the arm.

Other objects and features of the present invention will become apparent from the following description taken in conjunction with the accompanying drawings.

DETAILED DESCRIPTION OF THE PREFERRED EMBODIMENT

Figure 1:
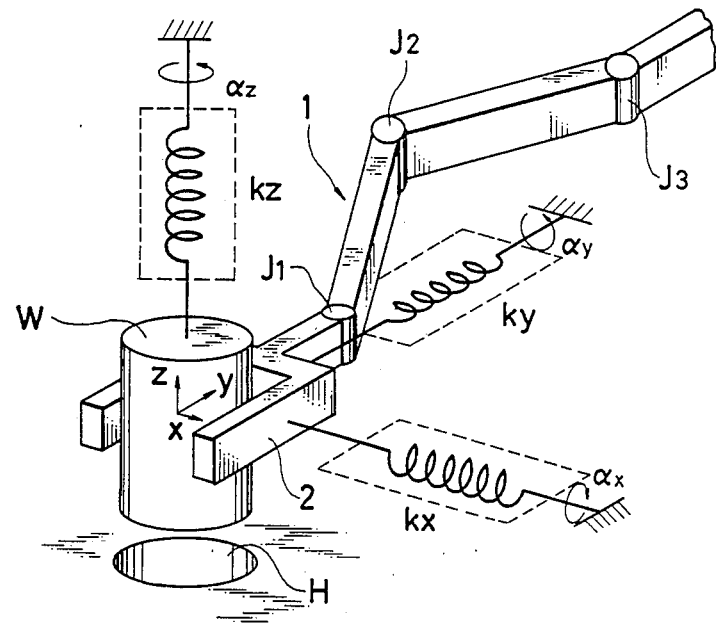
FIG. 1 is a schematic view of a conventional robot manipulator.
Figure 2:
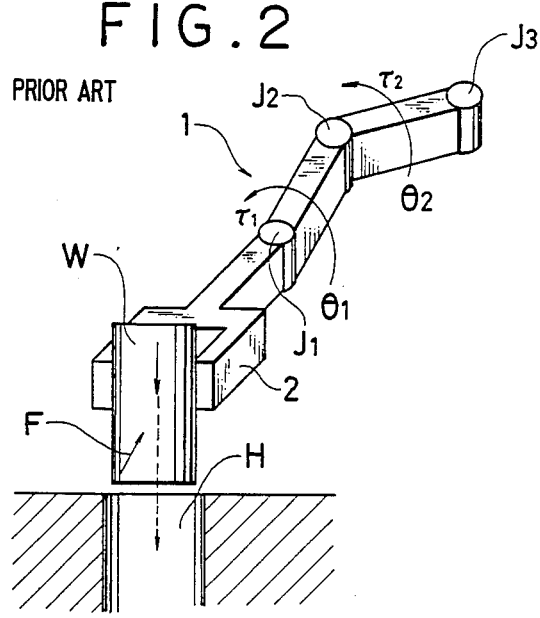
FIG. 2 is an illustration for explaining the action of the manipulator of FIG. 1.
Figure 3:
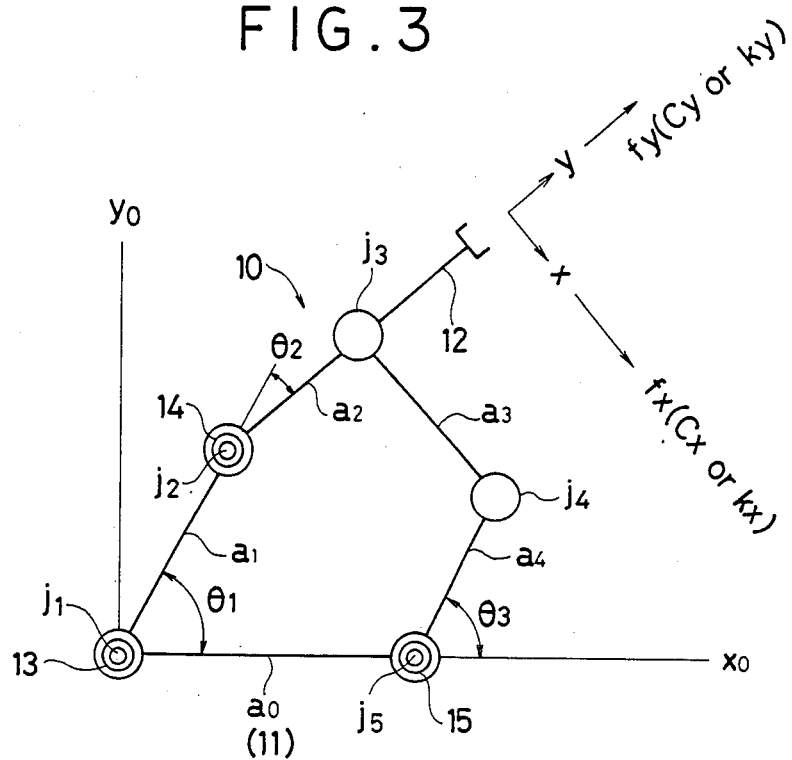
FIG. 3 is a schematic view of a manipulator according to one embodiment of the present invention.

One embodiment of a variable compliance manipulator according to the present invention will be described hereunder with reference to FIG. 3.

In the figure, 10 denotes a linkage arm. This arm 10 comprises a stationary segment $a_o$, a first moving segment a1 connected at one end thereof with one end of the stationary segment ao through a first joint $j_i$ of one degree of freedom, a second moving segment $a_2$ connected at one end thereof with the other end of the first moving segment $a_1$ through a second joint $j_2$ of one degree of freedom, a third moving segment $a_3$ connected at one end thereof with the other end of the second moving segment $a_2$ through a third joint $j_3$ of one degree of freedom, and a fourth segment $a_4$ connected at one end thereof with the third moving segment $a_3$ through a fourth joint $j_4$ of one degree of freedom and at the other end thereof with the other end of the stationary segment $a_o$ through a fifth joint $j_5$ of one degree of freedom. Thus, the adjacent stationary segment and moving segments forming one kinematic pair respectively, constitute a five-linkage structure. The stationary segment $a_o$ may be formed of a fixed link. Alternatively, the first joint $j_1$ and fifth joint $j_5$ may be fixed to a main body or base 11 of a robot in place of the stationary segment.

A connecting portion of the second moving segment $a_2$ with the third moving segment $a_3$ is extended outwardly to form a manipulator hand 12 (effector). Conversely, the manipulator hand 12 may be formed by extending outward the third moving segment $a_3$ beyond the connecting portion thereof with the second moving segment $a_2$. That is to say, this manipulator hand 12 is provided on whichever of the moving segments, $a_2$ or $a_3$, which is not directly connected with the stationary segment $a_o$.

On three joints of four joints i.e. joints ($j_1$, $j_5$) at both ends of the stationary segment $a_o$ and joints ($j_2$, $j_4$) at the respective other ends of the segments ($a_1$, $a_4$) in direct connection with the stationary segment $a_o$ actuators 13, 14 and 15 having variable stiffness property are provided. In this embodiment, the first, second and fifth joints $j_1$, $j_2$ and $j_5$ are provided with the above-mentioned actuators. It is of course possible that the fourth joint $j_4$ be provided with the actuator and any one of the others be omitted. It is noted that the load torque incurred by an arm base is reduced if the stationary joints $j_1$, $j_5$ of the joints $j_1$, $j_2$, $j_4$, $j_5$ are provided with two actuators and one of the other joints is provided with the remaining actuator. Each of these actuators 13, 14 and 15 includes a rotating motor or a driving mechanism such as a hydraulic system and a variable stiffness adjusting mechanism capable of varying the stiffness (inverse number of the compliance) by an electric control signal from outside.

As described in the foregoing, the arm 10 has a closed link strucure of five linkages including the joints of one degree of freedom and is driven by three driving actuators and stiffness adjusting mechanisms.

Figure 4:
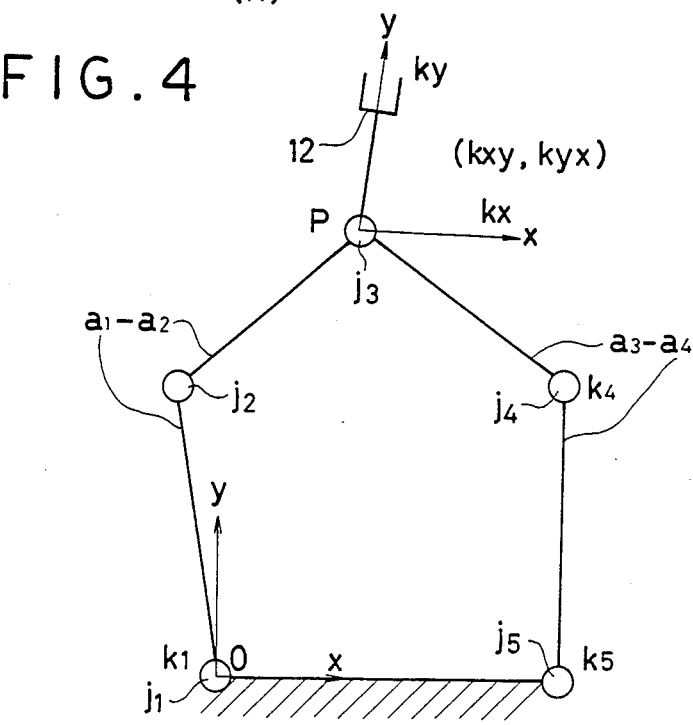
FIG. 4 is a schematic view of a control parameter of the manipulator of FIG. 3.

A stiffness control according to the stiffness equation of a manipulator is applied to the variable stiffness adjusting mechanism. The parameter necessary for this stiffness control is established by the procedure as shown in FIG. 4. In this embodiment, in order to adjust the stiffness in the respective directions of the coordinate system (hand-oriented coordinate system: x, y) set on the hand 12 by the stiffnesses $k_1$, $k_2$, $k_3$ of the joints, the relations between these stiffnesses must be known. These relations are, in general easily met using the principle of virtual work and are represented by the following equation:

$$K = R\phi[(J_A^{-1})^T K_A J_A + (J_B^{-1})^T K_B J_B]R\phi \quad (1)$$

wherein $$K = \begin{pmatrix} K_x & K_{xy} \\ K_{yx} & K_y \end{pmatrix}$$

- $K_x$: Stiffness in the x-axis direction of the coordinate system defined on the hand
- $K_y$: Stiffness in the y-axis direction of the coordinate system defined on the hand
- $K_{xy}$: Stiffness between the x- and y-axes of the coordinate system defined on the hand
- $K_{yx}$: Stiffness between the y- and x-axes of the coordinate system defined on the hand
- $R\phi$: Transition matrix from an absolute coordinate system O—XY set on a stationary portion of the manipulator to a coordinate system P-xy defined on the hand
- $J_A, J_B$: Jacobian Matrix of kinematic link $a_1$-$a_2$ and kinematic link $a_3$-$a_4$ of FIG. 4
- $K_A, K_B$: Stiffness matrix of joints of kinematic link $a_1$-$a_2$ and kinematic link $a_3$-$a_4$ of FIG. 4. If the stiffnesses of the respective joints are designated by $k_1$, $k_2$, $k_4$, $k_5$, the following relations are obtained:

$$K_A = \begin{pmatrix} K_1 & 0 \\ 0 & k_2 \end{pmatrix}$$

$$K_B = \begin{pmatrix} k_5 & 0 \\ 0 & k_4 \end{pmatrix}$$

T: Transposed matrix

As is apparent from the equation (1), the elements of K are represented by the following:

$$K_x = f(k_1, k_2, k_5)$$

$$K_y = g(k_1, k_2, k_5)$$

$$K_{xy} = K_{yx} = h(k_1, k_2, k_5) \quad (2)$$

wherein $k_4 = 0$.

Figure 5A:
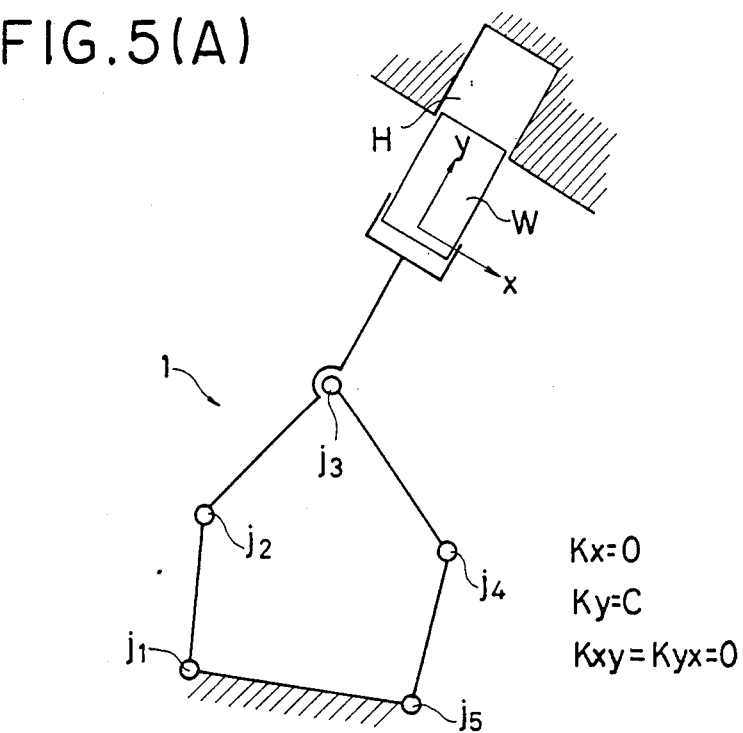
FIGS. 5(A) and 5(B) are schematic illustrations for explaining the behavior of the manipulator of FIG. 3 in peg-in-hole and crank turning tasks.
Figure 5B:
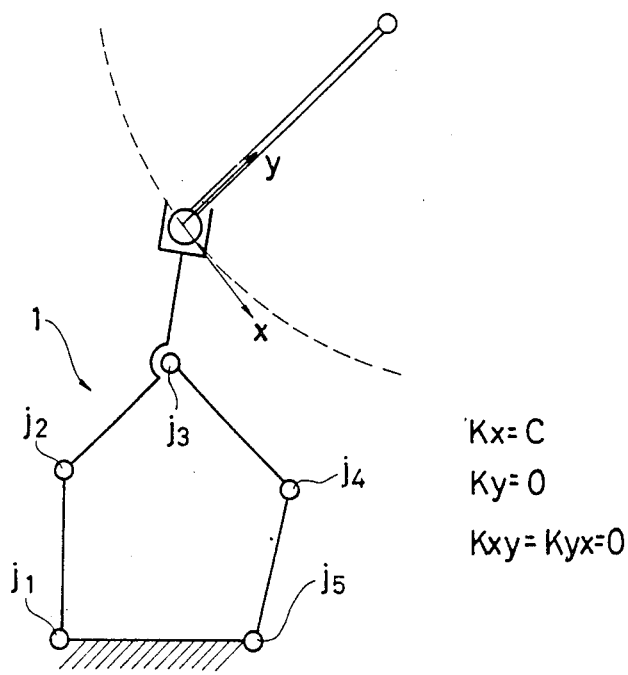

From the equation (2), $K_x$, $K_y$ and $K_{xy}$ can be determined by setting the stiffnesses of the joints, $k_1$, $k_2$ and $k_5$. In general, the values of $K_x$, $K_y$ and $K_{xy}$ are determined according to the nature of the work. In the work for inserting the pin W into the hole H as shown in FIG. 5(A), it is appropriate that $K_x$, $K_y$ and $K_{xy}$ be established as $K_x = 0$, $K_y = C$ (constant), and $K_{xy} = 0$. In the crank rotating work as shown in FIG. 5(B), $K_x$, $K_y$ and $K_{xy}$ are established as $K_x = C$, $K_y = O$, and $K_{xy} = 0$. Although $K_{xy}$ represents an interference component of the stiffness between X- and Y-axes in this embodiment, it is preferable that $K_{xy}$ be established as $K_{xy} = 0$. That is to say, the variable $K_{xy}$ representing the interference between the x- and y-axis coordinate systems should be preferably zero. At this time, the manipulator allows the X- and Y-axes to possess stiffness independently, thereby to realize a so-called selective compliance structure.

Figure 6:
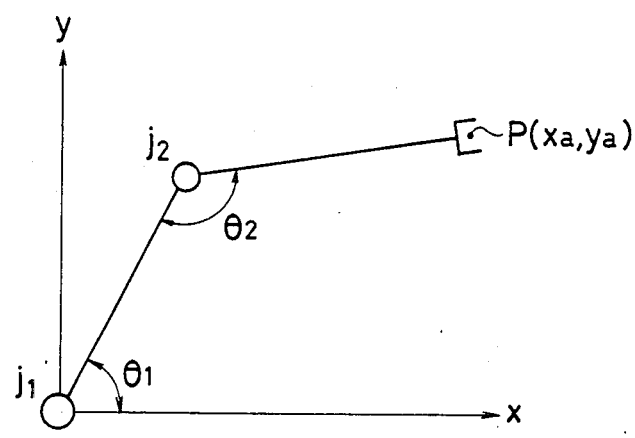
FIG. 6 is a schematic illustration of a two-linkage arm.

As apparent from the equation (2), in the two dimensional motion type manipulator, in order to designate the stiffness parameters on the task coordinate, it is necessary not only to determine the two parameters of $K_x$ and $K_y$, but also to set $K_{xy}$ as zero to eliminate the interference between the X- and Y-axis coordinates. As a result, in the selective compliance structure, the three parameters must be dealt with. Namely, these stiffness parameters on a task coordinate system require three joint stiffness parameters to be adjusted. In the usual two dimentional motion type manipulator system, in order to control the position of the front end P at which an object to be seized by the manipulator hand is located, only two positional control elements are required. More specifically, since the position P of the manipulator are represented by two parameters $x_a$, $y_a$ as $P(x_a, y_a)$ on the x-y plane as shown in FIG. 6, two joints are just enough to control the position by manipulating the joints. That is to say, the position P by the joints $j_1$ and $j_2$ on the coordinates can be determined in accordance with the following functions:

$x_a = f(\theta_1, \theta_2)$ $y_b = g(\theta_1, \theta_2)$ or the following inverse functions of the above:

$\theta_1 = F(x_a, y_b)$ $\theta_2 = G(x_a, y_b)$

Figure 7A:
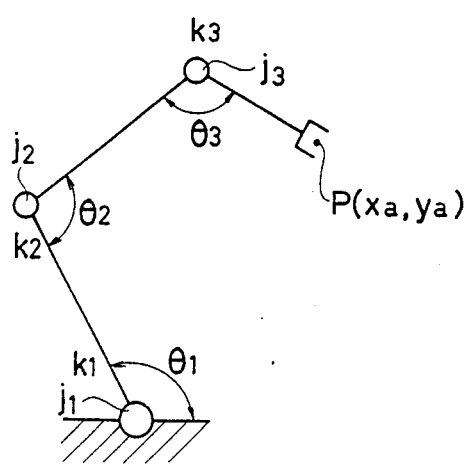
FIGS. 7(A) and 7(B) are schematic illustrations of a three-linkage arm.
Figure 7B:
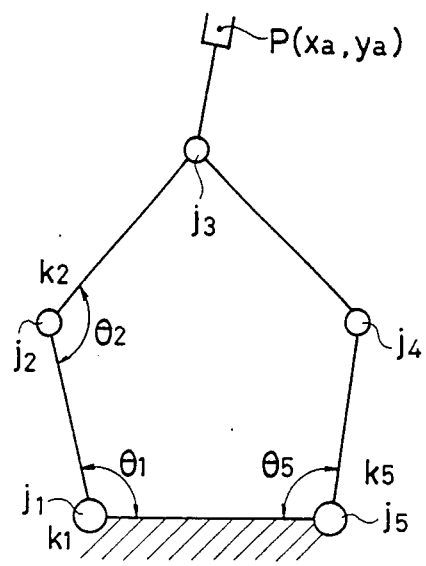

However, since three parameters of $K_x$, $K_y$, $K_{xy}$ ($=K_{yx}$) must be determined in order to obtain the desired stiffness of the manipulator, at least three joints are required even for the two dimentional motion type manipulator. Regarding the arrangement of three joints, there can be considered two types in the case of the two dimensional type manipulator as shown in FIG. 7, i.e. a serial type as shown in FIG. 7(A) and a parallel type as shown in FIG. 7(B). In the case of controlling the stiffness, both bring about almost the same effects.

However, in the case of realizing a system capable of controlling both stiffness and position, the serial type of FIG. 7(A) involves a problem. More specifically, when the coordinate point P ($x_a$, $y_b$) of the front end of the manipulator is given in this serial type, the manipulator does not always assume a fixed posture because there are three joint angles ($\theta_1$, $\theta_2$, $\theta_3$) in the manipulator and the positioning of the hand will be difficult.

On the other hand, in the parallel type as shown in FIG. 7(B) which is basically constructed by joining manipulators with two degrees of freedom in parallel, the effector of the manipulator, $P(x_a, y_a)$, can be uniquely determined by a set of joint angles $\theta_1$, $\theta_2$, $\theta_3$, $\theta_4$ without redundancy. The useful effects of the closed link structure of five-linkage type according to the invention reside in this point.

Figure 8:
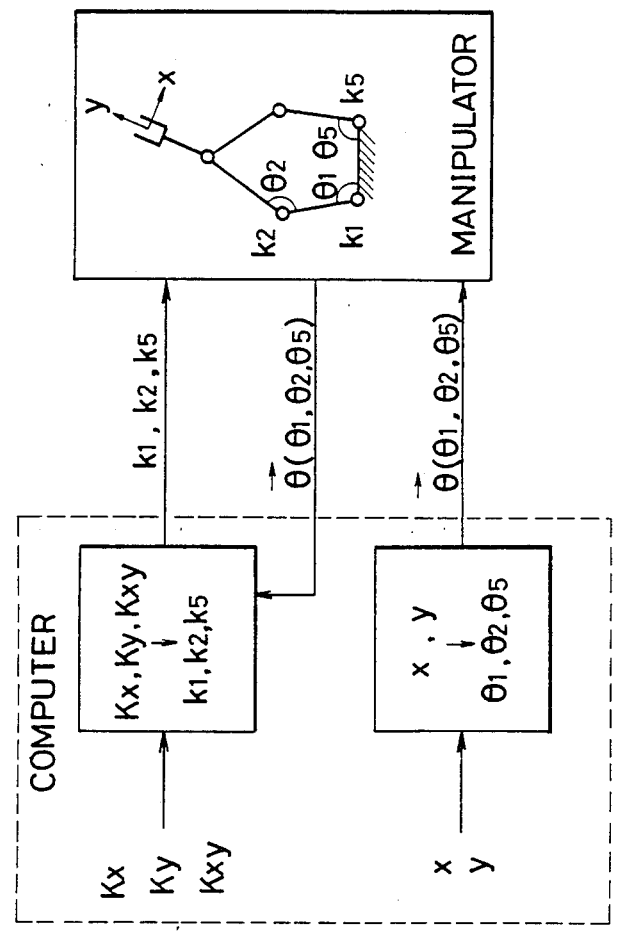
FIG. 8 is a schematic view of a control system.

FIG. 8 illustrates a schematic view showing a control system for controlling the stiffness and position of the manipulator. First, when $K_x$, $K_y$, $K_{xy}$ ($=0$) are determined so as to meet a desired job, $K_x$, $K_y$ and $K_{xy}$ are converted to stiffness values $k_1$, $k_2$, $k_5$ to be given to the joints according to the equation (2). Since the conversion formula thereof depends on the attitude of the manipulator at that time, the angles of the joints in the manipulator are always monitored by a position detector and sent to a controller. While controlling the stiffness, on the other hand, the manipulator can be simultaneously controlled in position. The values x, y in FIG. 8 show positional references on a task coordinate system and are converted to the corresponding joint positional references, $\theta_1$, $\theta_2$, $\theta_5$. Thus, the manipulator position is controlled with the adjusted joint stiffness. The parameters such as $K_x$, $K_y$, $K_{xy}$, x and y are usually programmed artificially to meet the desired work, and the conversion of the assigned commands on the task coordinate system to the commands on the joint coordinate system is carried out by means of a program in a computer.

Figure 9:
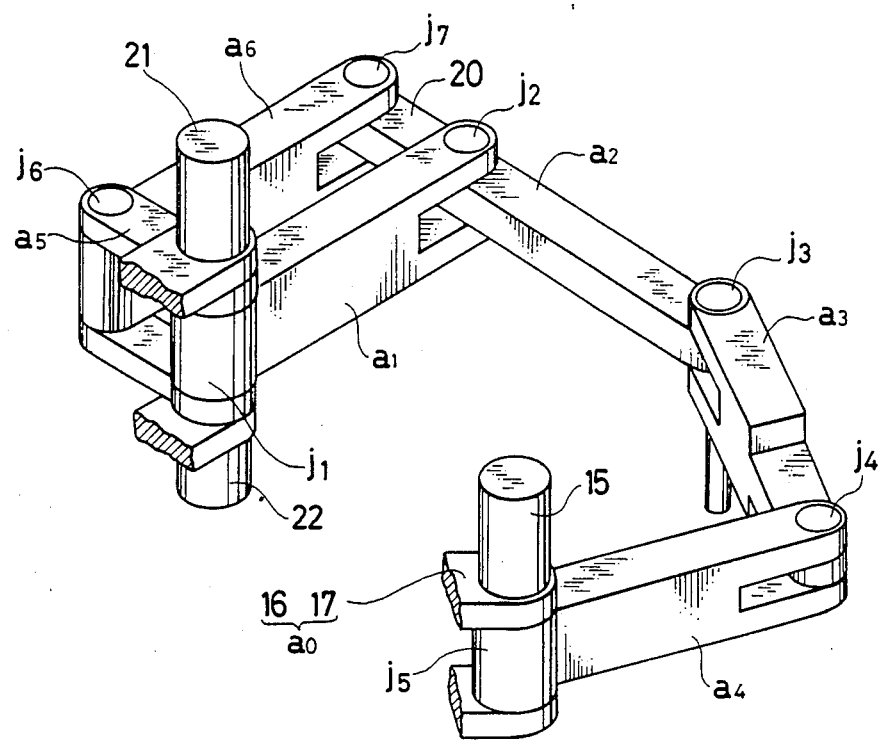
FIG. 9 is a perspective view of a manipulator according to a second embodiment of the present invention.
Figure 10:
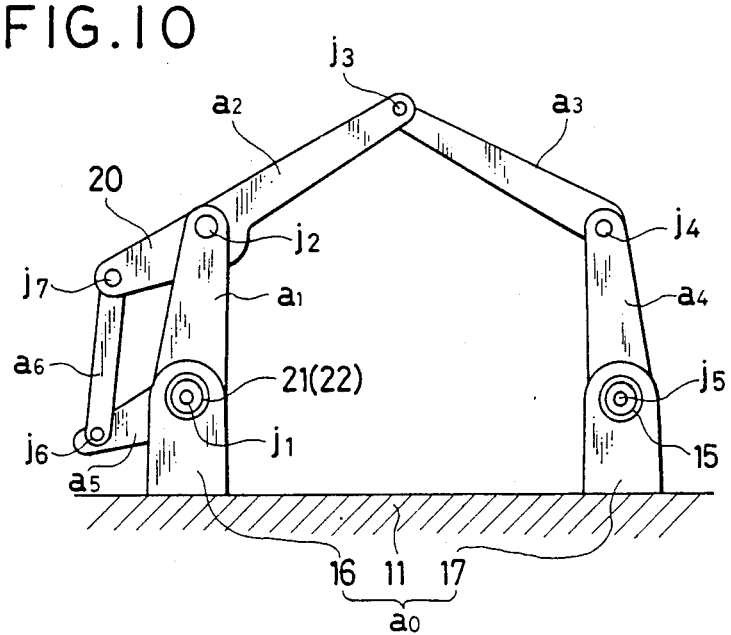
FIG. 10 is a schematic plan view of the same.

If a variable stiffness actuator is provided on the second joint $j_2$ in the five-linkage structure of FIG. 7(B), the manipulator will suffer a disadvantage that the actuator on the second joint becomes a load to the actuator of the first joint $j_1$. Therefore, it is desirable that the actuator be mounted on a fixed portion such as the stationary segment $a_o$. In view of the foregoing, a parallel arm structure as shown in FIGS. 9 and 10 are actually applicable. More specifically, as shown in the figures, the second moving segment $a_2$ is extended backward of the second joint $j_2$ to form an extended portion 20. On the first joint $j_1$ is supported a fifth moving segment $a_5$. A sixth moving segment $a_6$ is connected at one end thereof with the fifth moving segment $a_5$ through a sixth joint $j_6$ of one degree of freedom and at the other end thereof with the extended portion 20 through a seventh joint $j_7$ of one degree of freedom as illustrated. The moving segments $a_1$, $a_5$ and $a_6$ and extended portion 20 are arranged in a state of a parallelogram having the joints $j_1$, $j_2$, $j_6$ and $j_7$ as vertexes. The first joint $j_1$ and fifth joint $j_5$ are fixed to the base 11 by means of supporting members 16, 17. The stationary segment $a_o$ is constituted by these supporting members 16, 17 and base 11. In the figures, identical or similar components in this embodiment are denoted by like numerical symbols.

The first joint $j_1$ pivotally supporting first moving segment $a_1$ and fifth moving segment $a_5$ is coaxially provided with actuators 21, 22. The fifth joint $j_5$ includes an actuator 15.

Figure 11:
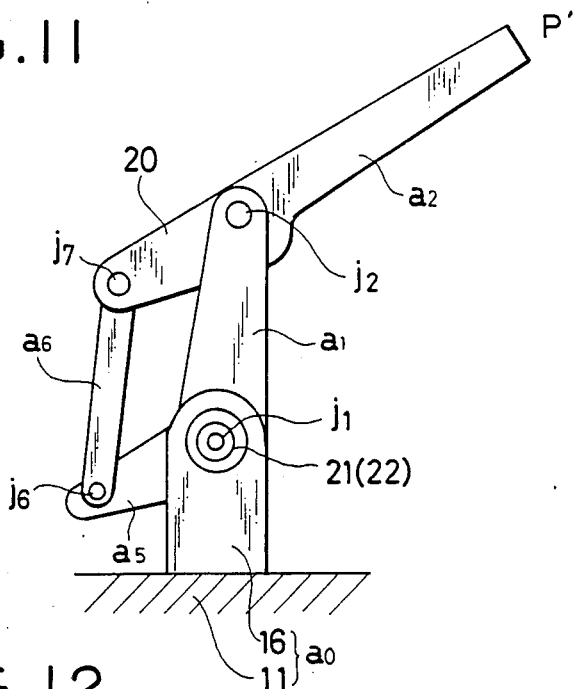
FIG. 11 is a schematic view showing a part of the same.
Figure 12:
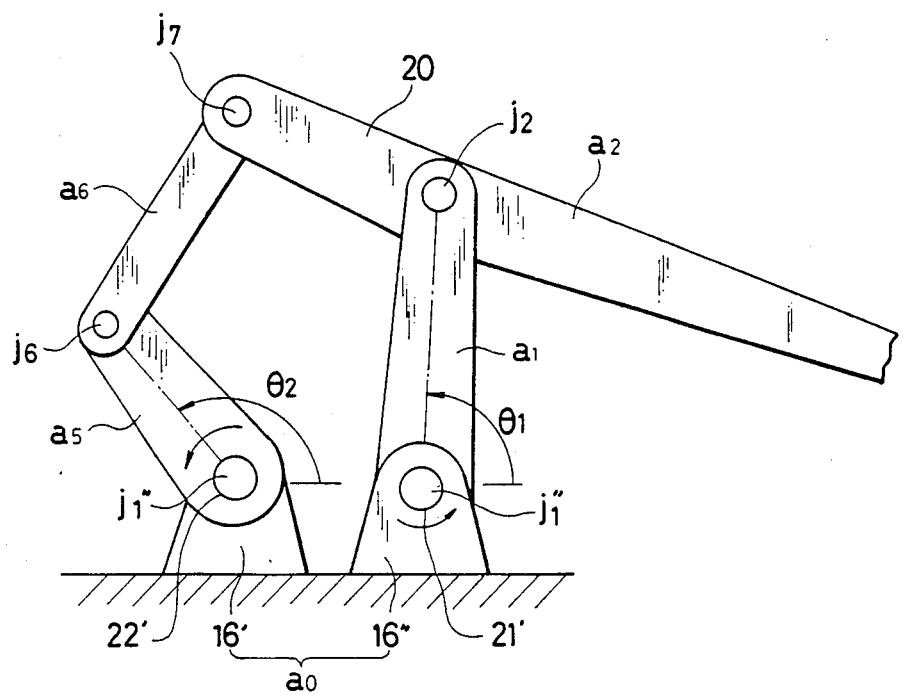
FIG. 12 is a schematic view showing a model of a five-linkage structure.

In view of only the parallelogram having the joints $j_1$, $j_2$, $j_6$ and $j_7$ as vertexes as shown in FIG. 11, this link structure is equivalent to the structure in which the distance between fixed joints $j_1'$ and $j_1''$ in a model structure as shown in FIG. 12 is set to 0 so as to unite the supporting members 16', 16'' in one body. In the five joint link mechanism in FIG. 12, the first moving segment $a_1$ and fifth moving segment $a_5$ are independently actuated by driving actuators 21', 22' on the joints $j_1'$, $j_1''$ in accordance with angular commands $\theta_1$ and $\theta_2$. The segment $a_2$ is driven in conjunction with the segments $a_1$, $a_5$. Thus, the position of the front end P' of the arm $a_2$ in FIG. 11 can be controlled by adjusting $\theta_1$, $\theta_2$. The foregoing can be applied to the five-linkage structure as shown in FIG. 10.

The driving joints $j_1$ in FIG. 10 are provided with actuators 21 and 22 and the joint $j_5$ has the actuator 15 so as to drive all the segments constituting the manipulator. Each of the actuators 21, 22 and 15 is provided with a stiffness-adjusting mechanism capable of varying the stiffness (spring constant) according to control commands given by an operator.

Figure 13:
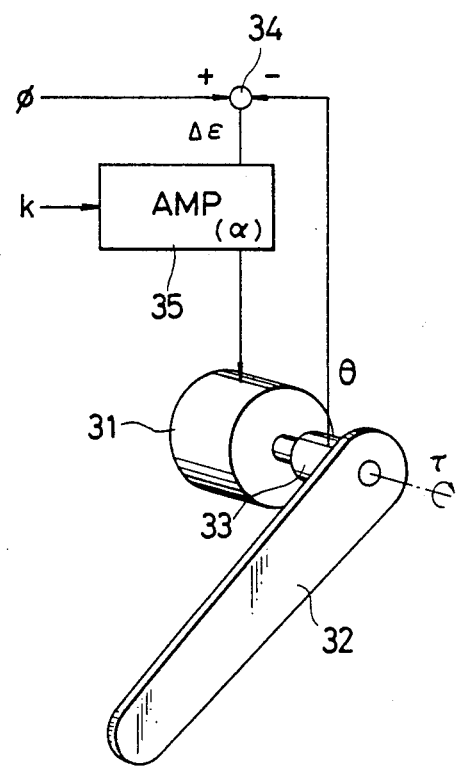
FIG. 13 is a schematic view of a manipulator servo system with variable compliance function.

One example of positional control system having a stiffness adjusting function is shown in FIG. 13. Specifically, it comprises a driving means such as a DC motor 31 including a reduction gear mechanism, a position detector 33, a subtractor 34 for obtaining a difference between output $\theta$ from the position detector 33 and b position reference $\phi$, and a variable gain amplifier (AMP). This is a typical position servo mechanism with adjustable gain, which is installed in each joint of the manipulator. In such a servo system as mentioned, there is given a general relation of $\tau = \alpha \cdot \Delta\epsilon$, wherein $\tau$ is the torque generated by the motor, $\alpha$ is the gain of the amplifier 35, and $\Delta\epsilon$ is the difference between the position reference and the actual joint angle which is detected by the position detector. This relation is obtained in the case that a becomes the stiffness of the joint. Therefore, the stiffness can be adjusted by setting the stiffness command k in the amplifier 33. On each of the joints of manipulator is mounted the actuator of FIG. 13. The output from a converting circuit in a control system for converting $K_x$, $K_y$, $K_{xy}$ to $k_1$, $k_2$, $k_5$ is used for adjusting the variable gain amplifier.

The variable stiffness manipulator having the above-mentioned structure requires joints larger in number by one compared with the conventional manipulator. By using the method according to the invention, however, the complexity of calculation for adjusting compliance will be reduced compared with the usual method in which compliance is adjusted using position and force detected at real time during a task because the determination of $k_1$, $k_2$, $k_5$ does not include any complicated calculation of the position and force.

As described in the foregoing, according to the the manipulator of a five-linkage structure of the present invention, the stiffness of the manipulator can be adjusted over a wide range independently and directly without any interaction with the object being worked on. In addition, it can be controlled with a satisfactory operation performance which is suited to the external restrictions.

What is claimed is:

1. A variable compliance manipulator comprising:
   a stationary segment, a first moving segment connected at one end thereof with one end of said stationary segment through a first joint of one degree of freedom, a second moving segment connected at one end thereof with the other end of said first moving segment through a second joint of one degree of freedom, a third moving segment connected at one end thereof with one other end of said second moving segment through a third joint of one degree of freedom, and a fourth segment connected at one end thereof with the other end of said third segment through a fourth joint of one degree of freedom and at the other end thereof with the other end of said stationary segment through a fifth joint of one degree of freedom, the adjacent joints forming five kinematic pairs, thereby to form a five linkage structure;
   a manipulator hand provided on one or the other of said second and third moving segments;
   actuators having a variable stiffness property, which are provided on at least two joints of said five joints; and
   a servo system for adjusting the stiffness in accordance with a variation between angular position information obtained by detecting the angle of said five linkage structure and a command set value for rendering a predetermined position.

2. The manipulator as claimed in claim 1, wherein said actuator is provided on at least three of said first, second, fourth and fifth joints respectively.

3. The manipulator as claimed in claim 2, wherein said actuator is provided on said first, second and fifth joints respectively.

4. The manipulator as claimed in claim 1, further comprising an extended portion formed by extending backwardly said second moving segment, a fifth moving segment supported at one end thereof on said first joint, a sixth segment connected at one end thereof with the other end of said fifth segment through a sixth joint of one degree of freedom and at the other end thereof with the end of said extended portion through a seventh joint of one degree of freedom, and an actuator for driving said fifth segment which actuator is coaxially disposed on said first joint together with the actuator for driving said first segment.

* * * * *